(12) United States Patent
Arimilli et al.

(10) Patent No.: US 6,725,304 B2
(45) Date of Patent: Apr. 20, 2004

(54) APPARATUS FOR CONNECTING CIRCUIT MODULES

(75) Inventors: Ravi Kumar Arimilli, Austin, TX (US); Daniel Mark Dreps, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 09/740,248

(22) Filed: Dec. 19, 2000

(65) Prior Publication Data

US 2002/0078280 A1 Jun. 20, 2002

(51) Int. Cl.[7] .............................. G06F 13/42; G06F 3/00
(52) U.S. Cl. ......................... 710/106; 710/21; 710/29; 710/105
(58) Field of Search ........................ 710/29, 21, 105, 710/106

(56) References Cited

U.S. PATENT DOCUMENTS

| | | | |
|---|---|---|---|
| 5,379,382 A | * | 1/1995 | Work et al. ................. 710/63 |
| 5,507,003 A | * | 4/1996 | Pipkins ........................ 710/31 |
| 5,640,495 A | * | 6/1997 | Colbert et al. .............. 358/1.13 |
| 5,715,409 A | * | 2/1998 | Bucher et al. ................ 710/62 |
| 6,243,776 B1 | * | 6/2001 | Lattimore et al. .......... 710/104 |
| 6,457,089 B1 | * | 9/2002 | Robbins et al. ............. 710/306 |

\* cited by examiner

*Primary Examiner*—Sumati Lefkowitz
*Assistant Examiner*—Trisha Vu
(74) *Attorney, Agent, or Firm*—Casimer K. Salys; Bracewell & Patterson, L.L.P.

(57) ABSTRACT

An apparatus for connecting circuit modules is disclosed. The apparatus for connecting circuit modules that receives an input and an output signal at one circuit module and uses a transmitter/receiver to transmit data to and receive data from the second circuit module. Each transmitter/receiver is selectable between a bidirectional mode that transmits and simultaneously receives via two transmission lines, and a unidirectional mode that transmits on a first transmission line and receives from a second transmission line.

15 Claims, 3 Drawing Sheets

APPARATUS FOR CONNECTING CIRCUIT MODULES

BACKGROUND OF THE INVENTION

1. Technical Field

The present invention relates to transmission line interfaces in general and, in particular, to transmission line interfaces for interconnecting integrated circuits. Still more particularly, the present invention relates to an apparatus for interconnecting integrated circuit modules.

2. Description of the Prior Art

The operating frequencies of integrated circuits have increased to the point that interconnection between circuit modules require techniques that are more sophisticated than impedance matching and pulse shaping. Typically, driver/receiver circuits use transmission lines that must span distances approaching a fraction of a wavelength at the processing frequencies since the shape of logic pulses is dependent on higher harmonics of the processing frequencies. Either single-ended interfaces or differential interfaces can be found in such driver/receiver circuits.

Both single-ended interfaces and differential interfaces have their advantages or disadvantages. For example, a differential interface requires two connections, which effectively reduces data throughput per wire. However, compared to single-ended interfaces, differential interfaces are usually less susceptible to common-mode noise and can provide a symmetrical load on power supplies and ground returns. Differential interfaces also have relatively better noise immunity because information that causes a state change in a signal line provides a corresponding opposite change in a complementary signal line. In addition, a differential interface is desirable for interconnects that are associated with the hot-insert capable interconnect, as a connector and cables or longer circuit board interconnects are needed to provide the hot insertion capability.

In light of the above, the present disclosure provides an improved interface for interconnecting integrated circuit modules.

SUMMARY OF THE INVENTION

In accordance with a preferred embodiment of the present invention, an apparatus for connecting circuit modules that receives an input and an output signal at one circuit module and uses a transmitter/receiver to transmit data to and receive data from the second circuit module. Each transmitter/receiver is selectable between a bidirectional mode that transmits and simultaneously receives via two transmission lines, and a unidirectional mode that transmits on a first transmission line and receives from a second transmission line.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
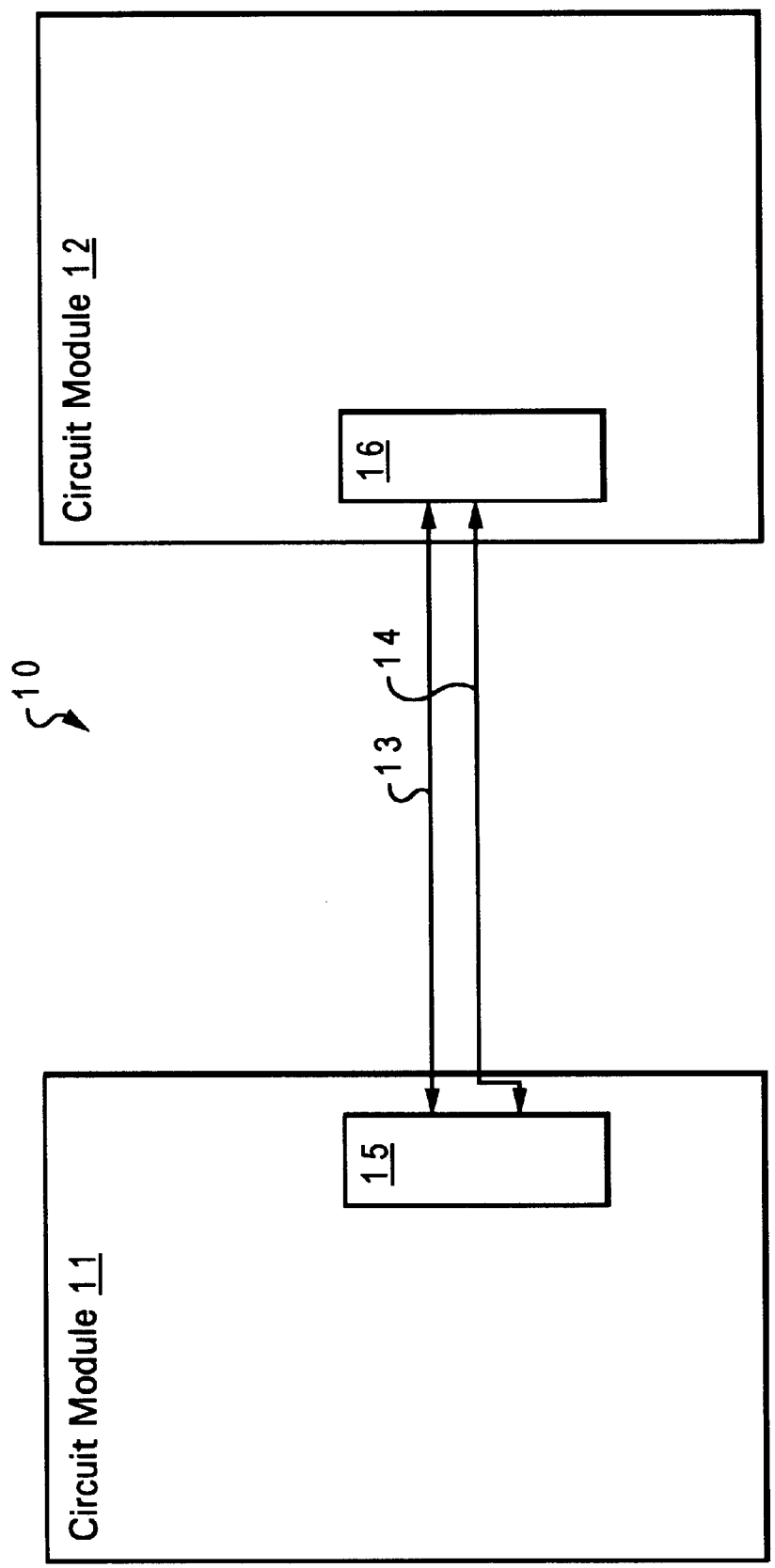
FIG. 1 is a block diagram of a bus connection, in accordance with a preferred embodiment of the invention.

Referring now to the drawings and, in particular, to FIG. 1, there is depicted a block diagram of a bus interface in accordance with a preferred embodiment of the present invention. As shown, a bus interface 10 includes a circuit module 11 coupled to a circuit module 12 via transmission lines 13–14. Circuit module 11 and circuit module 12 represents various types of configurations. For example, circuit module 11 and circuit module 12 may be circuit blocks within an integrated circuit requiring transceivers for communication due to long circuit paths. Circuit module 11 and circuit module 12 may be integrated circuits such as chips within a multi-chip module (MCM). Circuit module 11 and circuit module 12 may also be system components connected via rack connections. Circuit module 11 may even be a multiprocessor system mounted on a system board, and circuit module 12 is a hot-pluggable processor capable of connecting to the multiprocessor system via relatively long cables and connectors.

Transmitter/receiver 15 communicates with transmitter/receiver 16 via transmission lines 13 and transmission lines 14. Each of transmission lines 13 and 14 is arranged in a pair. Transmitter/receiver 15 and transmitter/receiver 16 support both single-ended and differential modes of transmission on transmission lines 13 and transmission lines 14. The above-mentioned modes are individually selectable for each transmission.

Figure 2:
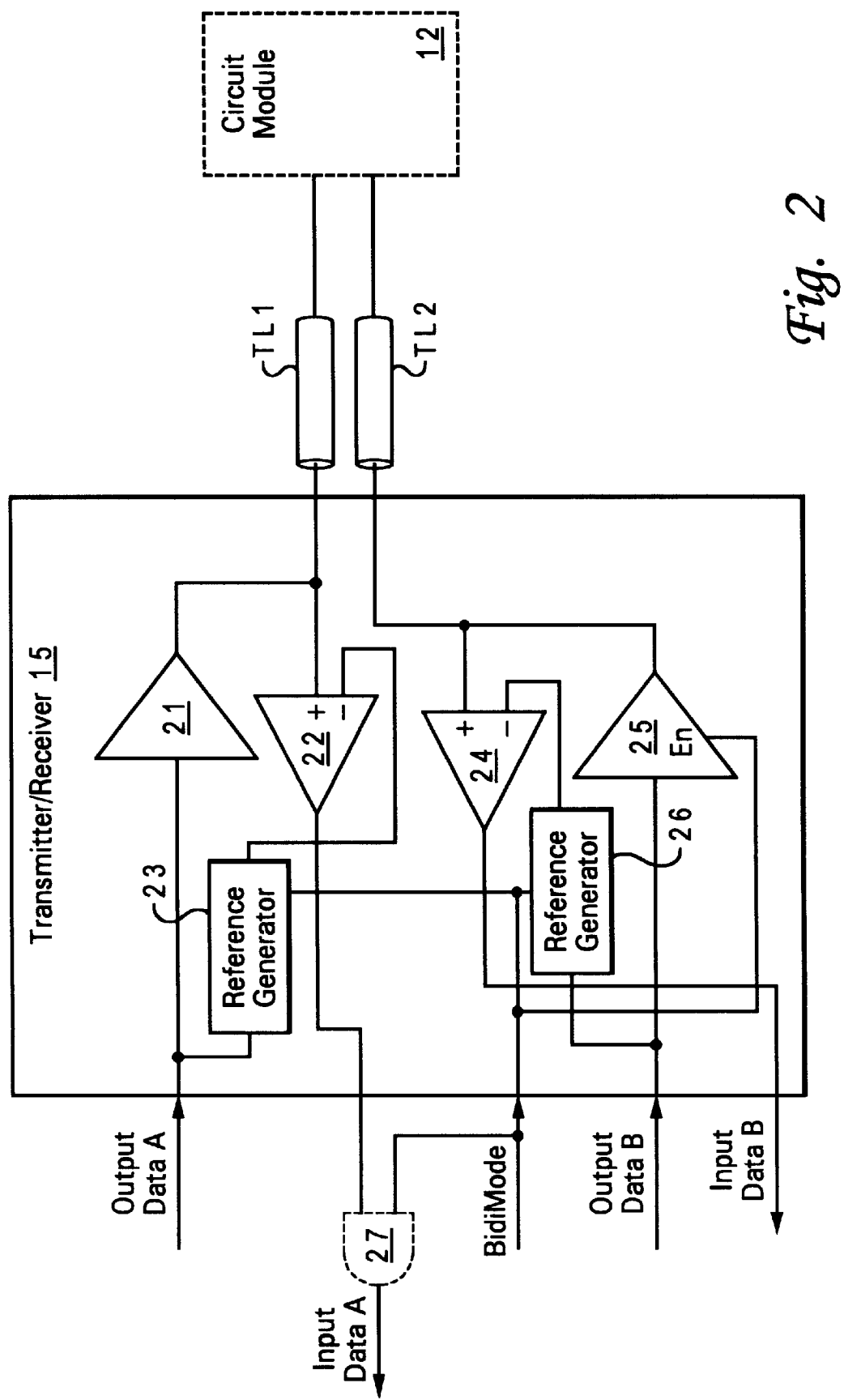
FIG. 2 is a schematic diagram of a receiver/transmitter from the bus connection of FIG. 1, in accordance with a preferred embodiment of the invention.

With reference now to FIG. 2, there is depicted a block diagram of a receiver/transmitter 15, in accordance with a preferred embodiment of the invention. A BidiMode signal is supplied to a receiver/transmitter 15 to control whether or not transmission lines TL1 and TL2 are used in simultaneous bidirectional mode. When the BidiMode signal is in a logic low state, transmitter/receiver 15 is in an unidirectional mode and transmits data to circuit module 12 over transmission line TL1 while receiving data from circuit module 12 over transmission line TL2. When the BidiMode signal is in a logic high state, transmitter/receiver 15 simultaneously transmits and receives data to and from circuit module 12 over both transmission line TL1 and transmission line TL2.

An Output Data A signal is coupled to transmitter/receiver 15 for communication to circuit module 12. An output driver 21 drives a transmission line TL1, which is coupled to circuit module 12. Thus, the Output Data A signal is represented in the signal supplied to transmission line TL1. The signal on transmission line TL1 is supplied to a comparator 22 for detecting input transmission line TL1 data that is output from transmitter/receiver 15 as an Input Data A signal. A logic AND gate 27 is depicted to coupled the Input Data A signal to illustrate that the received data from transmission line TL1 is not valid in the unidirectional mode. If the BidiMode signal is in a logic high state, reference generator will adjust the threshold of comparator 22 according to the state of the Output Data A signal, permitting simultaneous bidirectional communication over transmission line TL1. The BidiMode signal also enables AND gate 27, which illustrates the Input Data B signal is valid.

In a similar fashion, transmission line TL2 is driven by an output driver 25. Output driver 25 includes an enable input that is controlled by the BidiMode signal. When transmitter/receiver 15 is in the bidirectional mode (i.e., BidiMode is in a logic high state), output driver 25 will be enabled and a representation of an Output Data B signal will be impressed upon transmission line TL2. A comparator 24, which is coupled to transmission line TL2, is utilized to detect input data received from circuit module 12. Coupled to comparator 24, a reference generator 26 supplies a voltage threshold for such detection. Reference generator 26 is also controlled by the BidiMode signal. When transmitter/receiver 15 is in the bidirectional mode (i.e., BidiMode is in a logic high state), the threshold of comparator 24 will be adjusted by reference generator 26 according to the state of the Output Data B signal, permitting simultaneous bidirectional communication over transmission line TL2. When transmitter/receiver 15 is in the unidirectional mode (i.e., BidiMode is in a logic low state), the threshold of comparator 24 will be set to a static value, which is typically the midpoint of a signal swing in the unidirectional mode.

Mode selection can be accomplished via programmable registers, providing mode select bits for the pairs of transmission lines, TL1 and TL2, used within bus interface 10. Mode selection can also be accomplished by a detector coupled to transmission lines TL1 and TL2 for detecting environmental characteristics of transmission lines TL1 and TL2. The mode selection control signal can also be coupled to a precompensation, a drive level control and/or an output impedance control for tailoring output driver 21 and output driver 25 characteristics for bidirectional mode or unidirectional mode. Furthermore, the outputs and inputs of transmitter/receiver 15 can be coupled to an interface that is capable of synchronizing the received data to the local clocks for use within circuit modules 11 and 12.

Figure 3:
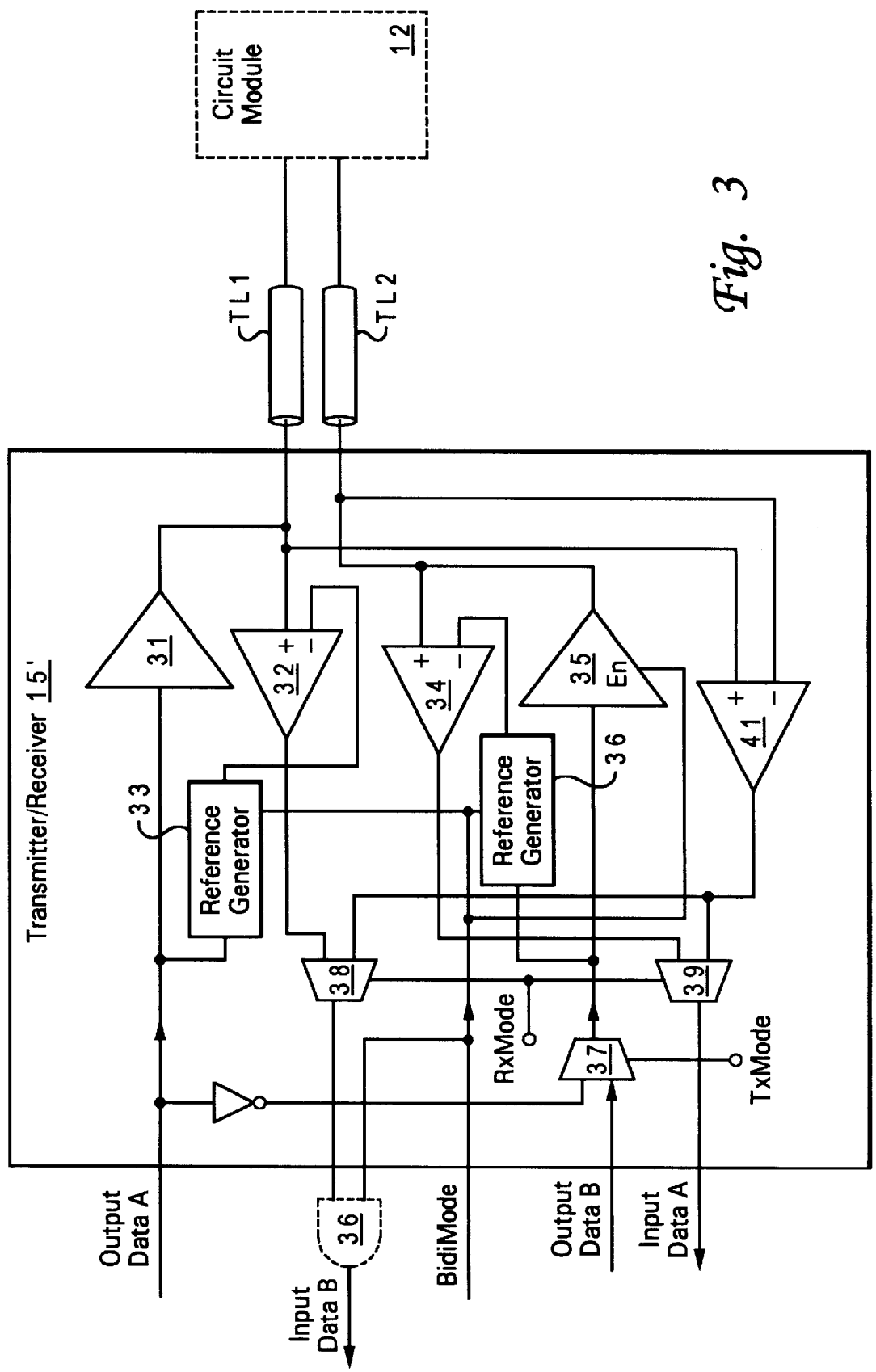
FIG. 3 is a schematic diagram of a receiver/transmitter from the bus connection of FIG. 1, in accordance with an alternative embodiment of the invention.

Referring now to FIG. 3, there is depicted a block diagram of a transmitter/receiver 15', in a accordance with an alternative embodiment of the present invention. This embodiment incorporates the selectable differential modes of communication. A BidiMode signal is supplied to transmitter/receiver 15' to control whether or not transmission lines TL1 and TL2 are used in simultaneous bidirectional mode. If the BidiMode signal is in a logic low state, transmitter/receiver 15' is in unidirectional mode and transmits data to circuit module 12 over transmission line TL1 while receiving data from circuit module 12 over transmission line TL2. If the BidiMode signal is in a logic high state, transmitter/receiver 15' will simultaneously transmit and receive data to and from circuit module 12 over transmission line TL1 and transmission line TL2.

An Output Data A signal is coupled to transmitter/receiver 15' for communication to circuit module 12. An output driver 31 drives a transmission line TL1 that is coupled to circuit module 12. Thus, the Output Data A signal is represented in the signal supplied to transmission line TL1. The signal on transmission line TL1 is supplied to a comparator 32 for detecting single-ended data input from transmission line TL1. Transmission line TL1 is also coupled to a differential comparator 41 for detecting differential data. The output of comparator 32 is sent to a selector 38, which is in turn sent to a logic AND gate 36 to be output as an Input Data B signal when the RxMode signal is in the logic low state (i.e., in a single-ended mode). AND gate 36 is depicted to coupled the Input Data B signal to illustrate that the received data from transmission line TL1 is not valid in the unidirectional mode. If the BidiMode signal is in a logic high state, reference generator 33 will adjust the voltage threshold of comparator 32 according to the state of the Output Data A signal, permitting simultaneous bidirectional communications over transmission line TL1. The BidiMode signal also enables AND gate 36, illustrating that the Input Data B signal is valid.

In a similar fashion, transmission line TL2 is driven by an output driver 35. Output driver 35 has an enable input that is controlled by the BidiMode signal. Output driver 35 is coupled to selector 37 that is controlled by a TxMode mode select signal. When TxMode is in a logic high state, the differential mode is selected and output driver 35 is driven by an inverted representation of Output Data A. When transmitter/receiver 15' is in the bidirectional mode (i.e., BidiMode in a logic high state), output driver 35 will be enabled and a representation of selector 37 output will be impressed on transmission line TL2. A comparator 34 is coupled to transmission line TL2 to detect single-ended input data received from circuit module 12. A reference generator 36 is coupled to comparator 34 to supply a threshold for detection. Reference generator 36 is controlled by the BidiMode signal, so that when transmitter/receiver 15' is in the bidirectional mode (i.e., BidiMode is in a logic high state), the threshold of comparator 34 will be adjusted by reference generator 36 according to the state of the Output Data B signal, permitting simultaneous bidirectional communication over transmission line TL2. When transmitter/receiver 15' is in the unidirectional mode (i.e., BidiMode is in a logic low state), the threshold of comparator 34 will be set to a static value, typically the midpoint of the signal swing in unidirectional mode. A differential comparator 41 is also coupled to transmission lines TL1 and TL2 for detecting differential signals. When the RxMode signal is in the high logic state (i.e., differential mode), selector 39 selects the output of differential comparator 41 for output to Input Data A, when the RxMode signals is in the low logic state (i.e., single-ended mode), selector 39 selects the output of comparator 34.

Transmitter/receiver 15' can be coupled to programmable mode register bits or environmental detection circuits. Output drivers 31 and 35 may have programmable precompensation characteristics, drive levels and/or output impedances selectable by the mode control signals. Adjustable output impedance is highly desirable for all of the circuits, as the differing voltage swings for bidirectional mode make a for an optimum impedance that differs from that in unidirectional mode.

As has been described, the present invention provides an apparatus for interconnecting integrated circuit modules.

While the invention has been particularly shown and described with reference to a preferred embodiment, it will be understood by those skilled in the art that various changes in form and detail may be made therein without departing from the spirit and scope of the invention.

What is claimed is:

1. A bus interface for interconnecting a first circuit module and a second circuit module, said bus interface comprising:
- a transmitter/receiver within said first circuit module, wherein said transmitter/receiver includes two data inputs and two data outputs, wherein said transmitter/receiver is selectable between a bidirectional mode and an unidirectional mode;
- a transmitter/receiver within said second circuit module, wherein said transmitter/receiver includes two data inputs and two data outputs;
- a pair of transmission lines coupled between said transmitter/receivers within said first circuit module and said second circuit module;
- means for receiving an indication of an operational mode selected for said transmitter/receiver within said first circuit module;

means for transmitting a first set of output data from said transmitter/receiver within said first circuit module to said second circuit module over a first one of said pair of transmission lines while simultaneously receiving a first set of input data from said second circuit module via said first one of said pair of transmission lines, and transmitting a second set of output data from said transmitter/receiver within said first circuit module to said second circuit module over a second one of said pair of transmission lines while simultaneously receiving a second set of input data from said second circuit module via said second one of said pair of transmission lines, in response to a receipt of an indication indicating that said transmitter/receiver within said first circuit module should be operated in a bidirectional mode; and means for transmitting a third set of output data from said transmitter/receiver within said first circuit module to said second circuit module over said second one of said pair of transmission lines while simultaneously receiving a third set of input data from said second circuit module via said first one of said pair of transmission lines, in response to a receipt of an indication indicating that said transmitter/receiver within said first circuit module should be operated in an unidirectional mode.

2. The bus interface of claim 1, wherein said transmitter/receiver within said first circuit module further includes two output drivers having an adjustable precompensation, wherein said adjustable precompensation is adjusted in conformity with said selected operational mode of said transmitter/receiver within said first circuit module.

3. The bus interface of claim 1, wherein said transmitter/receiver within said first circuit module further includes two output drivers having an adjustable drive level, wherein said adjustable drive level is adjusted in conformity with said selected operational mode of said transmitter/receiver within said first circuit module.

4. The bus interface of claim 1, wherein said transmitter/receiver within said first circuit module is coupled to an output of a detector for detecting environmental characteristics of said pair of transmission lines.

5. The bus interface of claim 1, wherein said transmitter/receiver within said first circuit module includes two output drivers having an adjustable output impedance, wherein said adjustable output impedance is adjusted in conformity with said selected operational mode of said associated transmitter/receiver within said first circuit module.

6. The bus interface of claim 1, wherein said transmitter/receiver within said first circuit module further comprises:

a first output driver having an output coupled to said first one of said pair of transmission lines for driving said first one of said pair transmission lines with said first data output;

a first comparator coupled to said first one of said pair of transmission lines; and a first reference generator coupled to said first comparator and a mode select input for adjusting a threshold of said first comparator according to said first data output when said mode select input selects said bidirectional mode.

7. The bus interface of claim 6, wherein said transmitter/receiver within said first circuit module further comprises:

a second output driver having an output coupled to said second one of said pair of transmission lines and an enable input coupled to a mode select signal for driving said second one of said pair of transmission lines with said second data output when said mode select signal selects said bidirectional mode;

a second comparator coupled to said second one of said pair of said transmission lines; and a second reference generator coupled to said second comparator and a mode select input for adjusting a threshold of said second comparator according to said second data output when said mode select input selects said bidirectional mode.

8. The bus interface of claim 6, wherein said transmitter/receiver within said first circuit module further comprises:

a differential comparator for receiving differential data from said first and second transmission lines; and a selector for selecting between an output of said differential comparator and an output of said comparator, wherein said selector is controlled by a mode signal for selecting between a differential mode or a single-ended receiver modes.

9. The bus interface of claim 6, wherein said transmitter/receiver within said first circuit module further comprises:

an inverter for inverting said first data output; and a selector, having inputs coupled to said second data output and an output of said inverter, and an output coupled to said output driver for selecting between transmitting a differential representation of said first data output over said first transmission line and said second transmission line when a differential mode is selected, or a single-ended representation of said first data output over said first transmission line and a single-ended representation of said second data output over said second transmission line when a single-ended mode is selected, wherein said selector is controlled by a mode signal for selecting between a differential mode or a single-ended receiver modes.

10. The bus interface of claim 1, wherein said transmitter/receiver within said first circuit module is further selectable between a differential mode and a single-ended mode.

11. A method of interconnecting a first subsystem and a second subsystem, said method comprising:

providing a transmitter/receiver within said first subsystem, wherein said transmitter/ receiver includes two data inputs and two data outputs;

providing a transmitter/receiver within said second subsystem, wherein said transmitter/ receiver includes two data inputs and two data outputs;

receiving an indication of an operational mode selected for a transmitter/receiver within said first subsystem;

in response to a receipt of an indication indicating that said transmitter/receiver within said first subsystem should be operated in a bidirectional mode, transmitting a first set of output data from said transmitter/receiver within said first subsystem to said second subsystem over a first transmission line coupled to said transmitter/receiver within said first subsystem while simultaneously receiving a first set of input data from paid second subsystem via said first transmission line, and transmitting a second set of output data from said transmitter/receiver within said first subsystem to said second subsystem over a second transmission line coupled to said transmitter/receiver within said first subsystem while simultaneously receiving a second set of input data from said second subsystem via said second transmission line; and in response to a receipt of an indication indicating that said transmitter/receiver within said first subsystem should be operated in an unidirectional mode, transmitting said first set of output data from said transmitter/receiver within said first subsystem to said second subsystem over said second transmission line while simultaneously receiving said first set of input data from said second subsystem via said first transmission line.

12. The method of claim 11, further comprising setting a precompensation level of an output driver within said transmitter/receiver within said first subsystem in response to said indication indicating that said transmitter/receiver should be operated in said bidirectional mode.

13. The method of claim 11, further comprising setting a drive level of an output driver circuit in response to said indication indicating that said transmitter/receiver within said first subsystem should be operated in said bidirectional mode.

14. The method of claim 11, further comprising detecting environmental characteristics of said transmission lines, and setting said operational mode in conformity with said detected environmental characteristic.

15. The method of claim 11, further comprising setting an impedance of an output driver circuit in response to said indication indicating that said transmitter/receiver within said first subsystem should be operated in said bidirectional mode.

* * * * *